United States Patent

Moriyama et al.

[11] 3,967,881
[45] July 6, 1976

[54] LIQUID CRYSTAL DISPLAY

[75] Inventors: Akio Moriyama, Katano; Masakazu Fukai, Nishinomiya; Seiichi Nagata, Sakai; Katsuji Hattori, Uji, all of Japan

[73] Assignee: Matsushita Electric Industrial Co., Ltd., Osaka, Japan

[22] Filed: Mar. 31, 1975

[21] Appl. No.: 563,800

[30] Foreign Application Priority Data

Apr. 4, 1974  Japan.............................. 49-38605
May 17, 1974  Japan.............................. 49-55868

[52] U.S. Cl............................ 350/150; 350/160 LC
[51] Int. Cl.²........................................... G02F 1/13
[58] Field of Search..................... 350/150, 160 LC

[56] References Cited
UNITED STATES PATENTS 3,551,026  12/1970  Heilmeier ........................... 350/150
3,731,986  5/1973  Fergason............................. 350/150

OTHER PUBLICATIONS

Scheffer: "New Multicolor Liquid Crystal Displays", *J. App. Phys.* vol. 44, pp. 4799–4803.

*Primary Examiner*—Edward S. Bauer
*Attorney, Agent, or Firm*—Stevens, Davis, Miller & Mosher

[57] ABSTRACT

Liquid crystal display in which a twisted nematic type liquid crystal cell is disposed between a linear polarizer and a guest-host type liquid crystal cell with homogeneous alignment and an electric field is selectively applied externally to arbitrary liquid crystal layers. Electro-optical control of inverted display of positive-to-negative images, complicated figure display and multi-color display is made possible.

4 Claims, 17 Drawing Figures

LIQUID CRYSTAL DISPLAY

This invention relates to liquid crystal display and more particularly to a device effective for performing inverted display of positive-to-negative images, complicated figure display and multi-colored display by electro-optical control by the use of two kinds of liquid crystal cells of different display mode, laminated with respect to the optical path.

In liquid crystal display, various display modes have been known. One of them is the so-called twisted nematic electro-optical cell proposed by Helfrich.

In the twisted nematic liquid crystal the plane of polarization rotates together with the nematic axis because the sample thickness is much larger than the wavelength of light.

When application of an electric field destroys the twisted configuration, the rotary power of the cell diminishes and eventually disappears. If the cell is placed between parallel or crossed polarizers, the rotary power of the cell permits one to go from dark to light or from light to dark, respectively.

Another of them is those using the guest-host interaction proposed by Heilmeir et. al.

A homogeneously aligned host nematic liquid crystal dissolving a dichroic dye as a guest exhibits a function as a kind of polarizer because of the anisotropy of optical absorption of the dye.

If a sheet of linear polarizer is placed in parallel to the plane of a sandwich cell containing the above-mentioned composition so that the plane of polarization should be directed in parallel or perpendicularly to the main optical absorption axis of the dye molecules, the color of the cell becomes colorless or dense, respectively.

When application of an electric field destroys the homogeneous configuration, the function of the cell as a polarizer vanishes.

This invention intends to laminate these two kinds of liquid crystal display cells to provide display functions being controllable electro-optically, which cannot be achieved with each single liquid crystal display cell.

An object of this invention is to provide a device of performing inversion display of positive-to-negative images and easily displaying complicated figures with the use of liquid crystal compositions by applying electric signals to two kinds of liquid crystal layers selectively.

Another object of this invention is to provide a device of liquid crystal display capable of multi-color display.

According to an embodiment of this invention, there is provided a liquid crystal display device comprising one linear polarizer, a first liquid crystal display cell containing a nematic liquid crystal composition with positive dielectric anisotropy dissolving a dichroic dye and exhibiting a homogeneous alignment, a second liquid crystal display cell containing a nematic liquid crystal composition with twisted structure located between said one linear polarizer and said first liquid crystal display cell, said linear polarizer, second and first liquid crystal display cells being disposed on an optical path in a laminated structure, and means for externally applying an electric field selectively to liquid crystal layers in said first and second liquid crystal display cells.

The present invention has advantages that 1. colored display is possible, and the range of selection of the color is wide,
2. inverted display of positive-to-negative images is possible and further transformation of colors of the displayed image is possible, and
3. display of complicated figures is made possible and further, multi-color display is made possible.

These advantages can be utilized in both the transmission and reflection type displays. Therefore, the present invention has great industrial merits.

Other objects, features and advantages of the present invention will become apparent from the following detailed description taken in conjunction with the accompanying drawings, in which.

Figure 1:
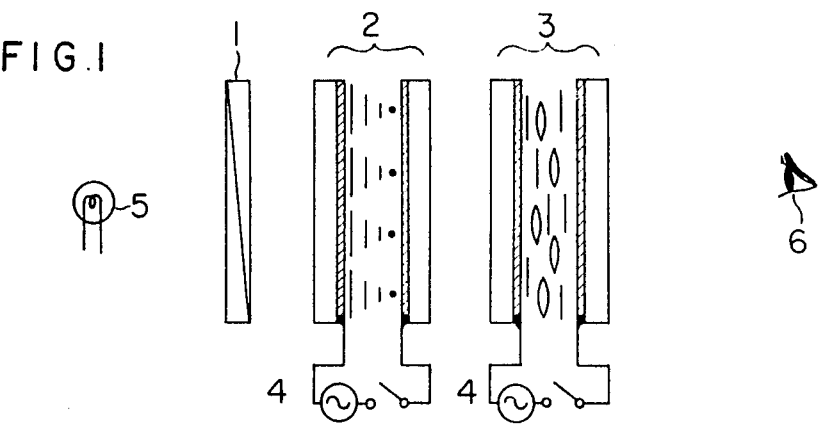
FIG. 1 is a cross-sectional, schematic diagram of a basic structure of the liquid crystal display according to this invention.

A basic structure of the inventive liquid crystal display is schematically shown in FIG. 1, in which a linear polarizer 1, a twisted nematic type liquid crystal display cell 2, and a guest-host type liquid crystal display cell 3 are placed on an optical path. A light source 5 is located on the optical path on the opposite side from a viewer 6. Control circuits 4 are provided for the cells 2 and 3. The preferred structures of the respective cells and the adjustment of the optical path will be described hereinbelow.

The twisted nematic type liquid crystal cell 2 comprises a pair of transparent substrates whose inner surfaces are coated with transparent conducting films and are treated so that the long axis of all the molecules interposed in a space therebetween should be directed in parallel to a predetermined direction, and a nematic liquid crystal with positive dielectric anisotropy fulfilled between the substrates and twisted by a distortion angle of 90°.

The guest-host type liquid crystal display cell 3 comprises a pair of transparent substrates whose inner surfaces are coated with transparent conducting films and are treated so that the long axis of all the molecules interposed in a space therebetween should be directed in parallel to a predetermined direction, and a nematic liquid crystal composition with positive dielectric anisotropy dissolving a dichroic dye fulfilled between the substrates and oriented in the homogeneous alignment.

The relative arrangement of these components are described hereinbelow.

The linear polarizer 1 and the guest-host type liquid crystal cell 3 are placed so that the polarized plane of the polarizer 1 should be arranged perpendicularly or in parallel to the molecular alignment in the cell 3.

At the same time, the linear polarizer 1 and the twisted nematic type liquid crystal cell 2 are placed so that the polarized plane of the polarizer 1 should be arranged perpendicularly or in parallel to the molecular alignment on the inner surface of the cell 2 adjacent to the polarizer 1.

In the arrangement, an electric field above threshold value is selectively applied to arbitrary liquid crystal layers in the cells 2 and 3.

The modes of display will be described in the case where patterns formed in the cells 2 and 3 have overlapping portions in the optical path.

EMBODIMENT 1

The linearly polarizing filter 1 was a polarizing filter of neutral color. The twisted nematic type liquid crystal cell contained a nematic liquid crystal composition A consisting of equal weight mixture of

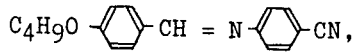

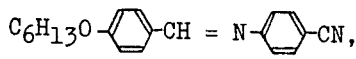

and the guest-host type liquid crystal display cell contained said liquid crystal composition A added with 1 weight percent of red dichroic dye represented by a general formula

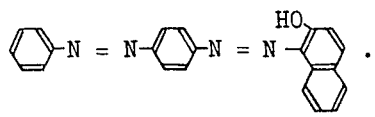

When an electric field above the threshold value was selectively applied to the liquid crystal display cell 2 and/or 3, the color observed by a viewer is as shown in Table 1.

Table 2

| Field application mode | Twisted type liquid crystal display cell | Guest-host type liquid crystal display cell |
|---|---|---|
| A | OFF | OFF |
| B | ON | OFF |
| C | OFF | ON |
| D | ON | ON |

In Table 2, "OFF" represents that the corresponding liquid crystal display cell is not applied with an electric field, and "ON" that the corresponding liquid crystal display cell is applied with an electric field of sufficient intensity.

According to the results of Table 1, display devices effective for performing inversion display of positive-to-negative images and complicated figure display are provided as in the following embodiments.

EMBODIMENT 2

Figure 2A:
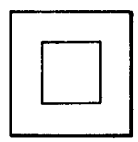
FIGS. 2A to 2D are front views of another embodiment of the display according to this invention applied to the display of figures.
Figure 2B:
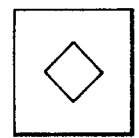
Figure 2C:
Figure 2D:
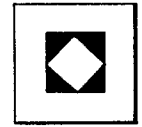

In the case of using the present liquid crystal display device in displaying figures, arbitrary patterns were formed on the twisted nematic type liquid crystal cell and on the guest-host type liquid crystal cell to utilize them in figure display. By the combinations, display of complicated figures were made easy. For an example, a pattern as shown in FIG. 2A was formed on the twisted nematic type liquid crystal cell and a pattern as shown in FIG. 2B on the guest-host type liquid crystal cell. When an electric field was applied to the twisted nematic type liquid crystal cell, a figure as shown in FIG. 2C was shown in red. When electric fields were applied to both the twisted nematic and the guest-host type liquid crystal cells, a figure as shown in FIG. 2D, was displayed in red. This kind of display cannot be achived with a singly layered cell.

Figure 3:
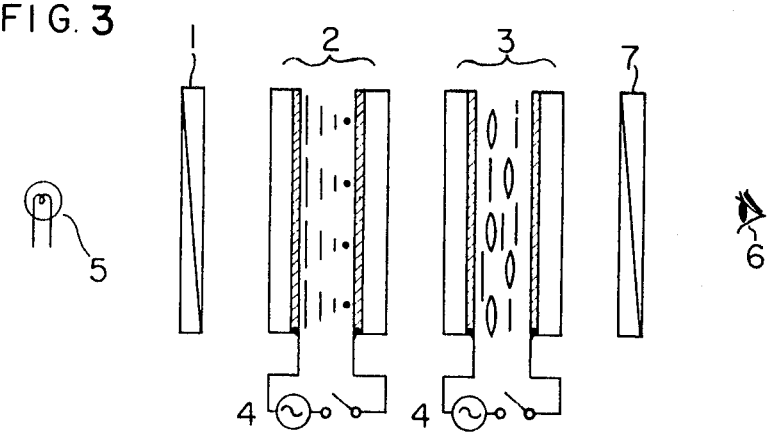
FIG. 3 is a cross-sectional, schematic view of another basic structure of the liquid crystal display according to this invention.

FIG. 3 shows another basic structure of the liquid crystal display device according to this invention. In this figure, similar numerals indicate similar parts as in Table 1

| Direction along the polarized plane of the linear polarizer 1 | Aligned direction of the liquid crystal molecules in the cell 3 | Field application and observed color | | | |
|---|---|---|---|---|---|
| | | A | B | C | D |
| ↑ | ↑ | red | colorless | colorless | colorless |
| ↑ | → | colorless | red | colorless | colorless |

In Table 1, such ↑ indicates the direction along the polarized plane of the linear polarizer 1 or the direction of alignment of the liquid crystal molecules in the guest-host type liquid crystal display cell 3, ↑↑ represents that the two directions are parallel to each other, and ↑→ represents that they are perpendicular to each other. Letters A, B, C, and D indicate the mode of voltage application to the liquid crystal display cells as listed in Table 2.

FIG. 1. Another polarizing filter 7 is disposed between the guest-host type liquid crystal cell 3 and a viewer 6.

EMBODIMENT 3

In the relative arrangement of the respective elements, the polarizing filter 7 was arranged to have a polarization plane being in parallel with or perpendicular to that of the polarizing filter 1. Other arrangement is similar to the case of FIG. 1.

When electric fields are selectively applied to the liquid crystal cells externally similar to the case of Embodiment 1, the modes of display in the case where the patterns of the two panels have overlapping portions in the optical path are shown in Table 3.

Table 3

| Optical alignment mode | Direction along the polarized plane of the filter 1 | Direction along the polarized plane of the filter 7 | Direction of molecular alignment in the guest-host type cell 3 | Field application and observed color | | | |
|---|---|---|---|---|---|---|---|
| | | | | A | B | C | D |
| (a) | ⊕ | ⊕ | ⊕ | dark | colorless | dark | colorless |
| (b) | ⊕ | ⊕ | ⊖ | dark | red | dark | colorless |
| (c) | ⊕ | ⊖ | ⊕ | red | dark | colorless | dark |
| (d) | ⊕ | ⊖ | ⊖ | colorless | dark | colorless | dark |

In Table 3, mark ⊕ or ⊖ represents the direction along the polarized plane of the polarizing filter 1 or 7 or that of the alignment of liquid crystal molecules in the guest-host type liquid crystal display cell 3. For example, in mode (a) the three directions are arranged in parallel to one another. In mode (b), the directions along the polarized plane of the polarizing filters 1 and 7 are parallel but that of the molecular alignment in the cell 3 is perpendicular to the other two. Modes (c) and (d) should be understood similarly. Letters A, B, C, and D represent modes of field application to the liquid crystal display cells 2 and 3 similar to those shown in Table 2.

Figure 4:
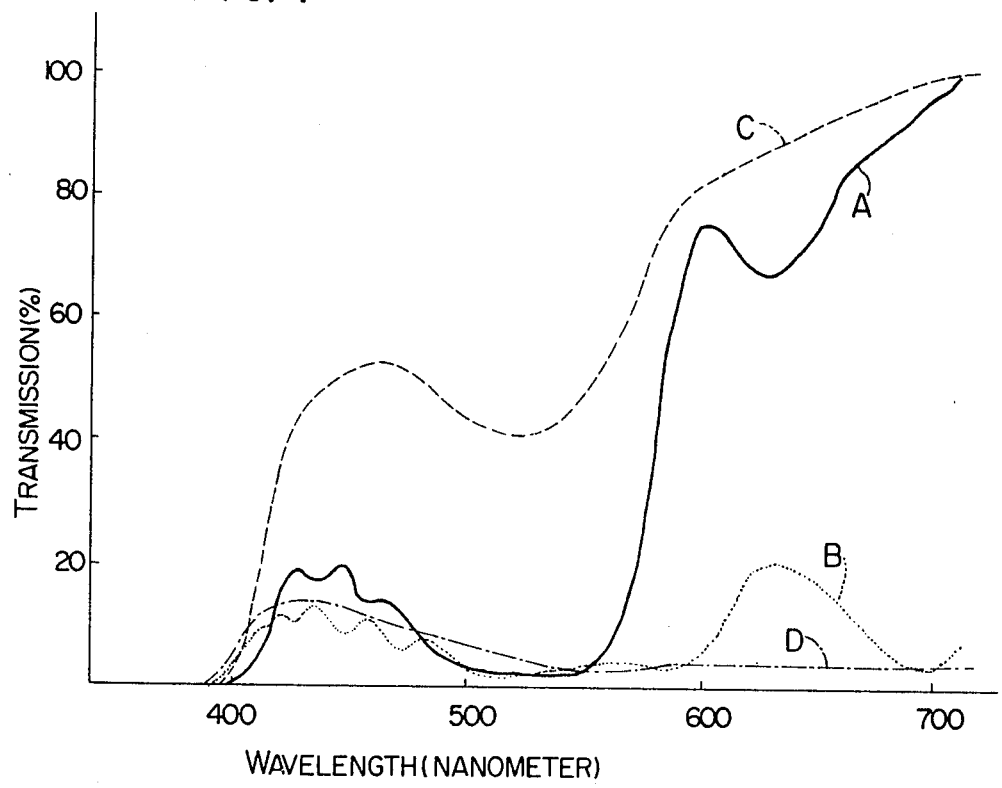
FIG. 4 is transmission spectra of a display device according to this invention selectively applied with electric fields.

FIG. 4 shows transmission spectra of the display device arranged in mode (c) with respect to the mode of field application. Letters A, B, C, and D in the figure represent the modes of field application listed in Table 2.

According to the results of Table 3, display devices effective for performing color-inverted display, multi-colored display, etc. are provided as in the following concrete embodiments.

EMBODIMENT 4

FIGS. 5A to 5D show an embodiment of the liquid crystal display applied to display of numerical digits as in a desk-top calculator.

Figure 5A:
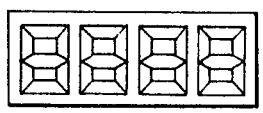
FIGS. 5A to 5D are front views of another embodiment of the display device according to this invention applied to the display of numerical digits.
Figure 5B:

The twisted nematic type liquid crystal display cell 2 was provided with a numerical digit pattern as shown in FIG. 5A, and the guest-host type liquid crystal display cell 3 was provided with a uniform background (without any figure) as shown in FIG. 5B. Similar to Embodiment 1, the twisted nematic type liquid crystal display cell 2 contained a liquid crystal composition A and the guest-host type liquid crystal display cell 3 contained a liquid crystal composition B. The respective cells were arranged in mode (c) of Table 3.

Figure 5C:
Figure 5D:

When the desk-top calculator was in the normal operation, the calculated result was represented in numerical digits displayed in dark with the function of the twisted nematic type liquid crystal display cell as shown in FIG. 5C. Here, the background was colored in red. When a calculation error occurred, the guest-host type liquid crystal display cell 3 was activated by an error signal. Then, the background was displayed as colorless keeping the display of the figure in dark as shown in FIG. 5D. By this arrangement, a user could easily find out a calculation error.

EMBODIMENT 6

Figure 6A:
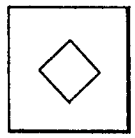
FIGS. 6A to 6F are front views of another embodiment of the display device according to this invention applied to the display of figures.
Figure 6B:
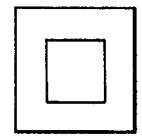

FIGS. 6A to 6F show the liquid crystal display of Embodiment 4 applied to the display of figures. The liquid crystal display cells 2 and 3 were provided with figure patterns as shown in FIGS. 6A and 6B. The respective cells were formed as in Embodiment 5, and similar optical alignment was done as in Embodiment 5.

Figure 6C:
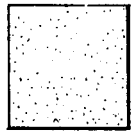
Figure 6D:
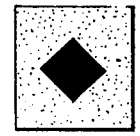
Figure 6E:
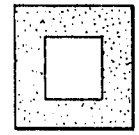
Figure 6F:
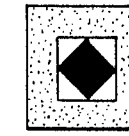

In this arrangement, the display surface was totally in red as shown in FIG. 6C when no electric fields were applied to the two cells. When an electric field above the threshold value was applied only to the liquid crystal cell 2, a figure of FIG. 6D was displayed in dark. When an electric field was applied only to the liquid crystal cell 3, a figure shown in FIG. 6E was displayed in colorless state. Further, when electric fields above the threshold value were applied to the both cells, the figures A, B, and C were displayed in red, colorless, and dark as shown in FIG. 6F.

As is described above, complicated figures can be displayed pleochroically.

Similar and further useful effects can be obtained by laminating layers of twisted type and/or guest-host type liquid crystal display cells.

Further, the color of the displayed figure can be selected variously by selecting the color of the polarizing filter or the dichroic dye used in the guest-host type liquid crystal display cell. Therefore, the possibility of color of displayed image is wide.

What is claimed is:
1. A liquid crystal display device comprising:
   one linear polarizer;
   a first liquid crystal display cell containing a nematic liquid crystal composition with positive dielectric anisotropy dissolving a dichroic dye and exhibiting a homogeneous alignment;
   a second liquid crystal display cell containing a neumatic liquid crystal composition of a twisted structure located between said one linear polarizer and said first liquid crystal display cell;
   said linear polarizer, second and first liquid crystal display cells being disposed on an optical path in a laminate structure; and
   means for externally applying an electric field selectively to liquid crystal layers in said first and second cells.

2. A liquid crystal display device according to claim 1, further comprising another linear polarizer disposed on the optical path after said first liquid crystal display cell.

3. A liquid crystal display device according to claim 1, in which the twisted angle of the twisted structure in said second liquid crystal display cell is substantially 90°.

4. A liquid crystal display device according to claim 3, in which the direction along the polarized plane of said linear polarizer and the direction of alignment of the liquid crystal molecules in said first liquid crystal display cell are arranged in parallel or perpendicular alignment, and the direction along the polarized plane of said linear polarizer and the direction of alignment of nematic liquid crystal molecules in said second liquid crystal display cell on an inner surface adjacent to said one linear polarizer are arranged in parallel or perpendicular alignment.

* * * * *